(12) United States Patent
Whitesell

(10) Patent No.: US 6,177,913 B1
(45) Date of Patent: Jan. 23, 2001

(54) VOLUMETRIC DISPLAY

(75) Inventor: Eric James Whitesell, San Diego, CA (US)

(73) Assignee: The United States of America as represented by the Secretary of the Navy, Washington, DC (US)

(*) Notice: Under 35 U.S.C. 154(b), the term of this patent shall be extended for 0 days.

(21) Appl. No.: 09/065,227

(22) Filed: Apr. 23, 1998

(51) Int. Cl.$^7$ .................................................. G09G 5/00
(52) U.S. Cl. .................................................. 345/6; 348/42
(58) Field of Search .................................... 345/6; 348/37, 348/51, 48, 46, 54; 359/326, 462; 354/4

(56) References Cited

U.S. PATENT DOCUMENTS

| | | |
|---|---|---|
| 3,940,203 | 2/1976 | La Russa . |
| 4,414,565 | 11/1983 | Shanks . |
| 4,663,869 | 5/1987 | Nakagawa . |
| 4,799,739 | 1/1989 | Newsanger . |
| 5,066,525 | 11/1991 | Nakemashi et al. . |
| 5,099,320 | 3/1992 | Allio . |
| 5,146,246 | 9/1992 | Marks . |
| 5,225,861 | 7/1993 | Marks . |
| 5,684,621 | * 11/1997 | Downing ............................. 359/326 |

* cited by examiner

*Primary Examiner*—Dennis-Doon Chow
(74) *Attorney, Agent, or Firm*—Harvey Fendelman; Michael A. Kagan; Eric James Whitesell

(57) ABSTRACT

A volumetric display comprises complementary segments made of a transparent material. An optical scattering layer is formed on a surface between adjoining segments. The segments are joined to form a display volume that may be rotated to cause the scattering layer to sweep out the entire display volume each revolution. A scanning beam may be used to illuminate points on the scattering layer at selected rotation angles to create a three-dimensional image.

7 Claims, 3 Drawing Sheets

VOLUMETRIC DISPLAY

The invention described below is assigned to the United States Government and is available for licensing commercially. Technical and licensing inquiries may be directed to Harvey Fendelman, Legal Counsel For Patents, Space and Naval Warfare Systems Center D0012, 53510 Silvergate Avenue Rm. 103, San Diego, Calif. 92152-5765; telephone no. (619)553-3001; fax no. (619)553-3821.

BACKGROUND OF THE INVENTION

The present invention relates to volumetric displays. More specifically, but without limitation thereto, the present invention relates to a rotating projection screen for a three-dimensional volumetric display.

3-D display technologies such as holography, stereoscopic displays, and advanced 3-D graphics engines generally render 3-D images as a two-dimensional display by mapping the coordinates of the 3-D images into 2-D perspective. However, these technologies lack the physiological depth cues needed for true 3-D display imaging, such as motion parallax, accommodation, convergence, and binocular disparity. A 3-D volumetric display provides the physiological depth cues needed for such applications as automotive design, architecture, and medical imaging.

One method for displaying a three-dimensional image is to illuminate a series of points on a two-dimensional surface as it sweeps out a volume with a periodic motion. In FIG. 1, a 3-D volumetric display 10 of the prior art comprises beam deflector control circuit 102, beam deflectors 104, 106, and 108, mirrors 110, a display surface 120, and a drive motor 130. In this example, display surface 120 is implemented as a double helix, although other surface geometries may also be used, such as a single helix, a multiple helix, a piston, etc. Drive motor 130 imparts a periodic motion to display surface 120 within a display volume 122. Beam deflector control circuit 102 inputs world coordinates of a scene and causes beam deflectors 104, 106, and 108 to direct light beams 116 onto display surface 120 from mirrors 110. Light beams 116 illuminate view coordinates on display surface 120 to generate an image representative of the scene corresponding to the input world coordinates. The motion of display surface 120 scatters light from light beams 116 at different positions within display volume 122, time-multiplexing the illuminated view coordinates to generate a complete three-dimensional image to the eye of an observer 150. As long as the diameter of display surface 120 is within about three feet, a reasonably stable image may be obtained. For larger displays several feet in diameter, however, mechanical instability and irregularities in the propeller shape of display surface 120 can cause unacceptable jitter in the displayed image. Also, the air resistance of a spinning large surface causes noisy operation.

A need therefore exists for a volumetric display that can be scaled up to a suitable size for automotive and medical applications.

SUMMARY OF THE INVENTION

The volumetric display of the present invention is directed to overcoming the problems described above, and may provide further related advantages. No embodiment of the present invention described herein should be construed to preclude other embodiments or advantages that may exist or become obvious to those skilled in the art.

The volumetric display of the present invention comprises complementary segments made of a transparent material. An optical scattering layer is formed on a surface between adjoining segments. The segments are joined to form a display volume that may be rotated to cause the scattering layer to sweep out the entire display volume each revolution. A scanning beam may be used to illuminate points on the scattering layer at selected rotation angles to create a three-dimensional image.

An advantage of the volumetric display of the present invention is that 3-D images may be displayed with physiological depth cues, including motion parallax, accommodation, convergence, and binocular disparity.

Another advantage is that the display surface may be deposited within close tolerances, minimizing distortion due to surface irregularities.

Still another advantage is that the display surface is not distorted by air resistance or acceleration, minimizing distortion due to motion.

Another advantage is that the solid geometry of the display has an attractive appearance and affords quiet operation.

Yet another advantage is that the display surface may be made thin enough to illuminate voxels from one side and to emit light from both sides.

The features and advantages summarized above in addition to other aspects of the present invention will become more apparent from the description, presented in conjunction with the following drawings.

DESCRIPTION OF THE INVENTION

The following description is presented solely for the purpose of disclosing how the present invention may be made and used. The scope of the invention is defined by the claims.

Figure 1:
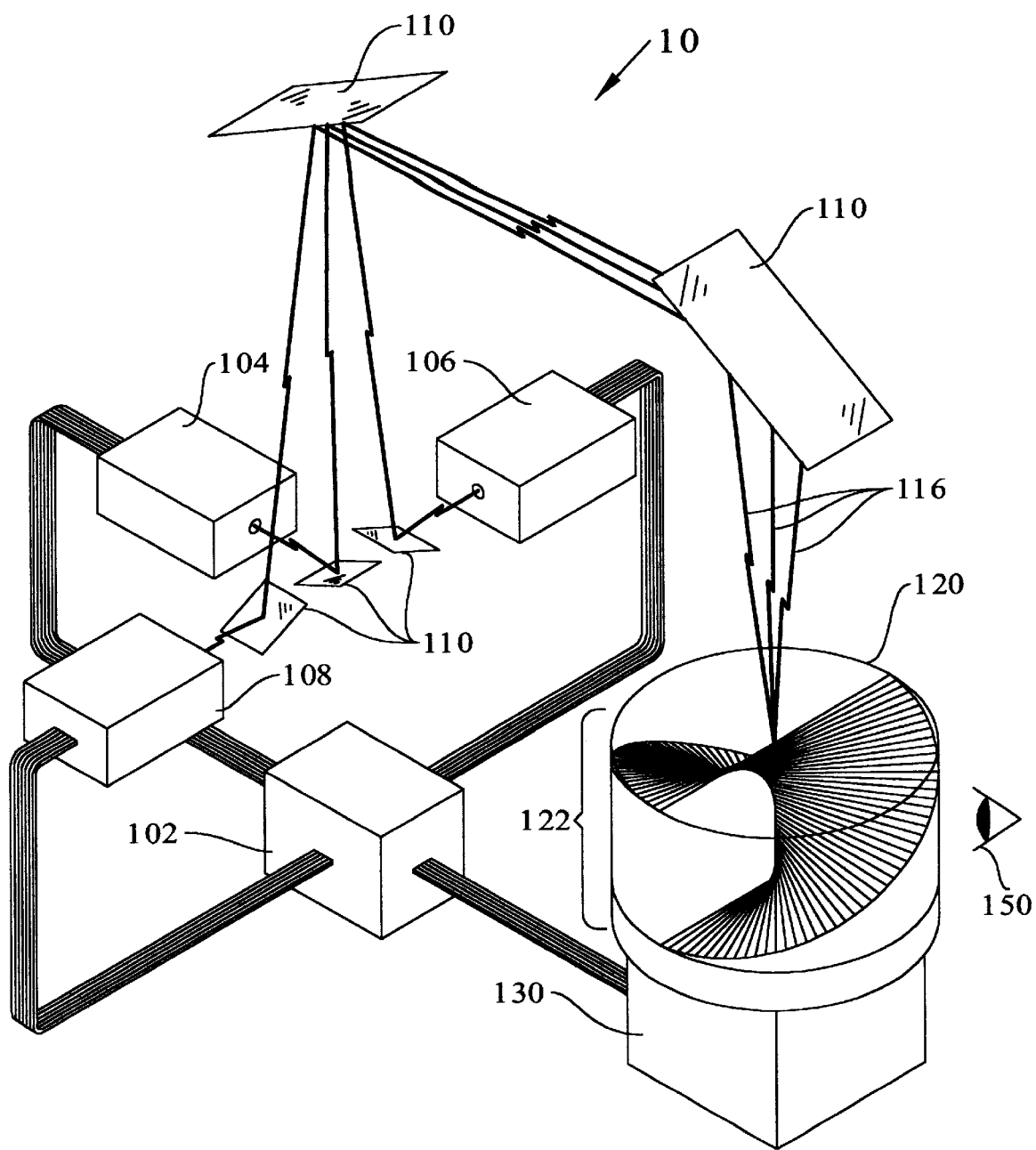
FIG. 1 is perspective view of a 3-D volumetric display system of the prior art.
Figure 2:
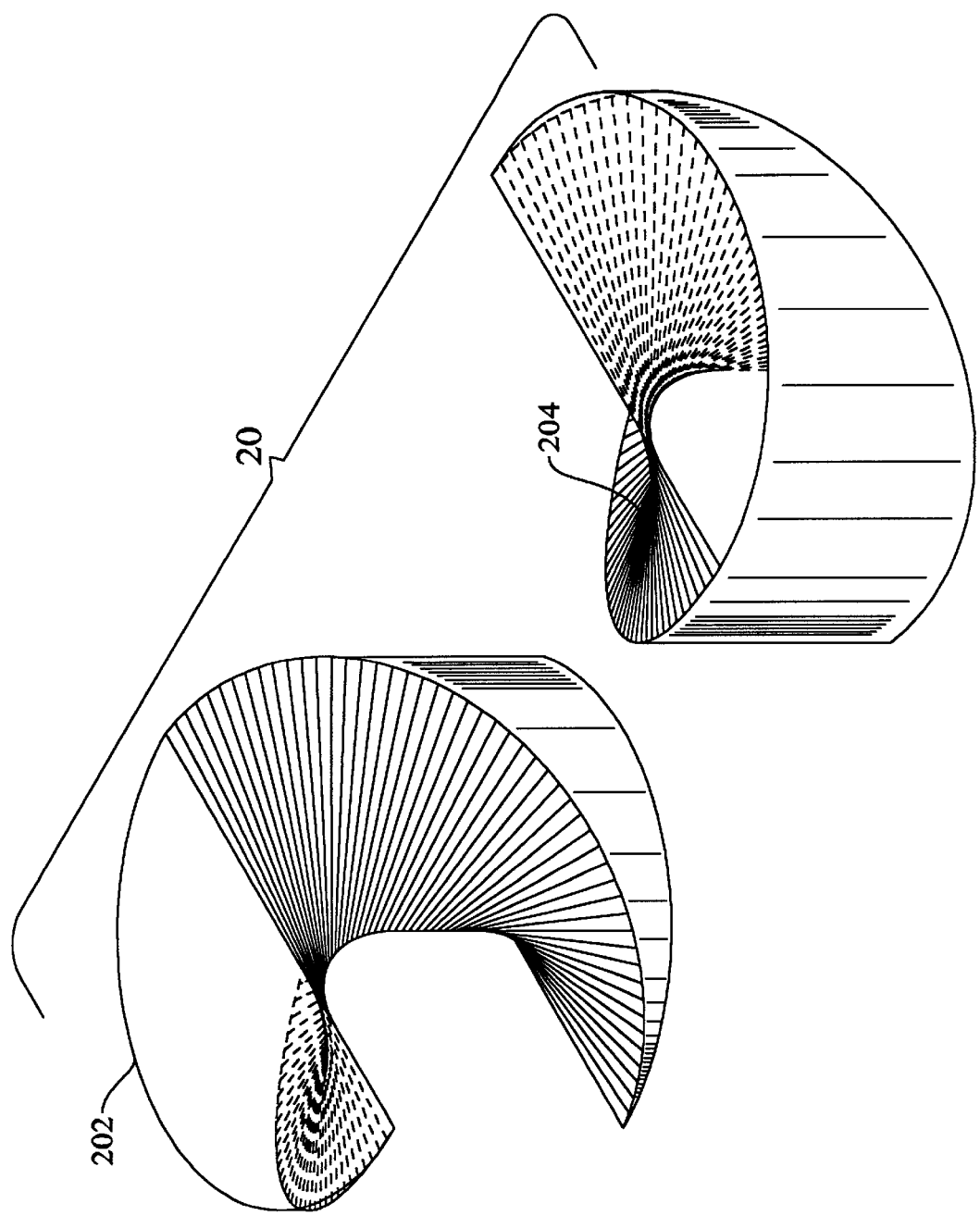
FIG. 2 illustrates complementary segments of a volumetric display of the present invention.

In FIG. 2, a volumetric display 20 comprises complementary segments 202. Complementary segments 202 are preferably made of a transparent material such as optical glass or clear plastic and may be formed by well known techniques used in manufacturing lenses and mirrors for telescopes. An optical scattering layer 204 is deposited on one or more interior surfaces of complementary segments 202. Scattering layer 204 may be made of titanium dioxide, for example, and deposited or etched according to well known techniques. Alternatively, scattering layer 204 may be formed by a textured etching of one or more of segments 202 according to well known techniques. Scattering layer 204 may also be made sufficiently thin to make a voxel visible on both sides when illuminated from one side.

Figure 3:
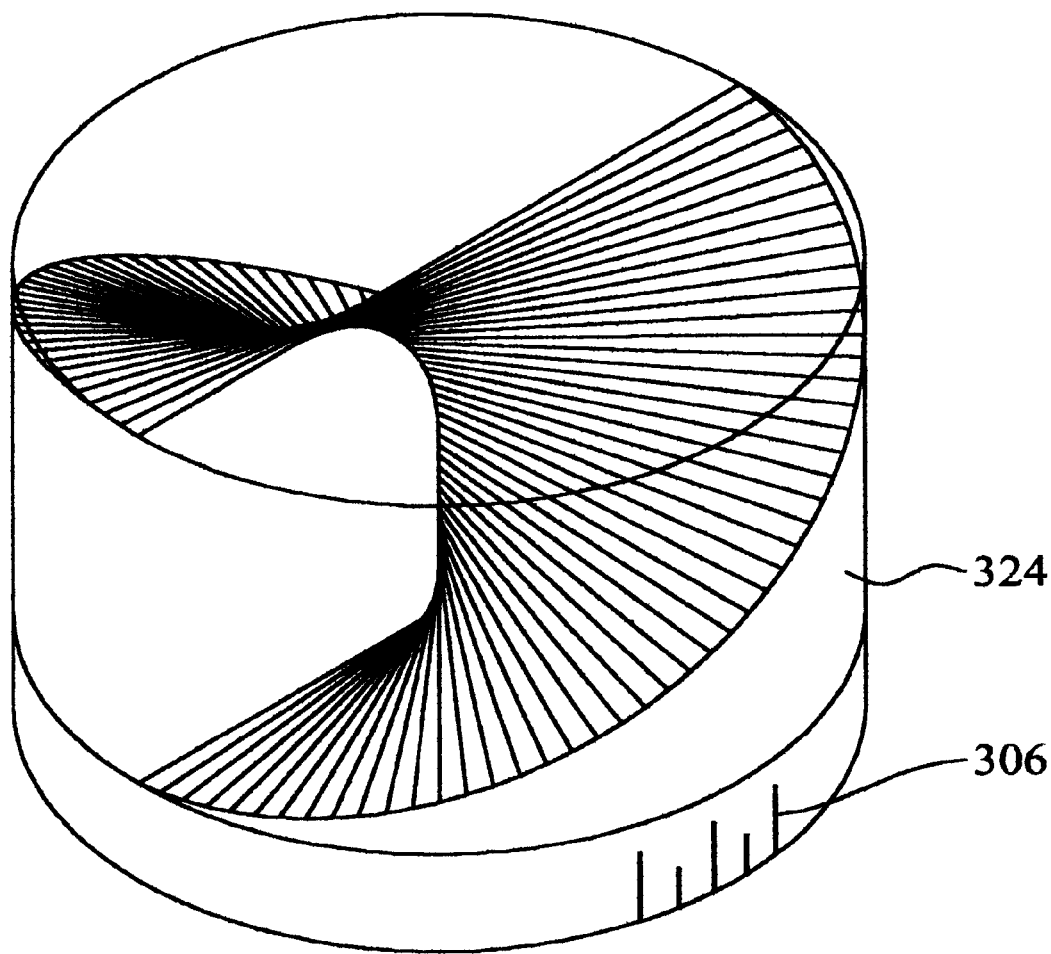
FIG. 3 shows the complementary segments of FIG. 2 joined to form a cylindrical display volume.

In FIG. 3, complementary segments 202 are joined and bonded according to well known techniques to form display volume 122. Display volume 122 may have the shape of a cylinder, for example. Markings 306 may be formed by, for example, etching the bottom surface of display volume 122 for synchronizing external light beams with the angular position of scattering layer 204. An antireflective coating 324 may be deposited on the outer surface of display volume 122 using techniques and materials well known in the art to minimize ambient glare and internal reflections.

Other modifications, variations, and applications of the present invention may be made in accordance with the above teachings other than as specifically described to practice the invention within the scope of the following claims.

I claim:

1. A volumetric display comprising:

a first complementary segment made of a substantially transparent material and having a surface;

an optical scattering layer formed on said surface and a second complementary segment made of said substantially transparent material and adjoined to said first complementary segment so that said optical scattering layer is interposed between said first and second complementary segments whereupon said first and second complementary segments define a display volume.

2. The volumetric display of claim 1 wherein said transparent material comprises at least one of glass and plastic.

3. The volumetric display of claim 1 wherein said optical scattering layer comprises titanium dioxide.

4. The volumetric display of claim 1 wherein said optical scattering layer is formed by etching an interior surface of at least one of said complementary segments.

5. The volumetric display of claim 1 wherein said display volume has a substantially cylindrical shape.

6. The volumetric display of claim 1 further comprising synchronization marks formed on at least one of said complementary segments for determining angular position.

7. The volumetric display of claim 1 further comprising an antireflective coating formed on an outer surface of at least one of said complementary segments.

* * * * *